United States Patent [19]

Laffkas

[11] Patent Number: 5,161,626
[45] Date of Patent: Nov. 10, 1992

[54] METHOD FOR EMBEDDING LINES, ANCHORING CABLES, AND SINKING WELLS

[75] Inventor: Harry P. Laffkas, Fort Wayne, Ind.

[73] Assignee: Industrial Engineering, Inc., Fort Wayne, Ind.

[21] Appl. No.: 625,079

[22] Filed: Dec. 10, 1990

[51] Int. Cl.[5] .......................... E21B 4/14; E21B 7/26; F24J 3/08

[52] U.S. Cl. ........................................ 175/22; 175/61; 175/62; 175/296; 285/382; 405/184

[58] Field of Search .................... 175/61, 62, 19, 22, 175/296, 293, 294, 295, 297; 166/50; 165/45; 405/184

[56] References Cited

U.S. PATENT DOCUMENTS

| | | | |
|---|---|---|---|
| 313,521 | 3/1885 | Powers . | |
| 1,210,187 | 12/1916 | Marquiss | 175/22 |
| 3,011,567 | 12/1961 | Turner | 175/62 X |
| 3,550,698 | 12/1970 | Pauley | 175/62 X |
| 3,873,156 | 3/1975 | Jacoby | 299/4 |
| 4,020,641 | 5/1977 | Takada | 175/62 X |
| 4,042,046 | 8/1977 | Capoccia | 175/73 |
| 4,144,941 | 3/1979 | Ritter | 175/19 |
| 4,286,651 | 9/1981 | Steiger | 165/45 |
| 4,431,069 | 2/1984 | Dickinson, III, et al. | 175/61 |
| 4,523,644 | 6/1985 | Dismukes | 166/302 |
| 4,570,705 | 2/1986 | Walling | 166/77 |
| 4,585,061 | 4/1986 | Lyons, Jr. | 166/77 |
| 4,632,191 | 12/1986 | McDonald et al. | 175/19 |
| 4,679,637 | 7/1987 | Cherrington et al. | 175/61 |
| 4,694,913 | 9/1987 | McDonald et al. | 175/61 |
| 4,714,118 | 12/1987 | Baker et al. | 175/26 |
| 4,867,255 | 9/1989 | Baker et al. | 175/61 |
| 4,955,439 | 9/1990 | Kinnan | 175/61 X |
| 5,031,706 | 7/1991 | Spektor | 175/296 X |

OTHER PUBLICATIONS

Allied: Hole-Hog® Underground Piercing Tool, Form No. HH15/88 2DM, 1988; Solon, Ohio.

*Primary Examiner*—Stephen J. Novosad
*Attorney, Agent, or Firm*—Lundy & Associates

[57] ABSTRACT

An impact borer, a connector, a method for embedding lines and an improved method for sinking geothermal wells. The impact borer has a shell, which has a longitudinal bore. An anvil closes one end of the bore. A ram is reciprocally slideable within the bore, against and away from the anvil. The ram divides the bore into front, rear, and ram chambers. A director is joined to the shell. The director is monolithic. The director isolates the front and rear chambers in alternation upon reciprocation of the ram. The director defines an inlet passage communicating with the ram chamber and an outlet passage communicating with the rear chamber.

28 Claims, 5 Drawing Sheets

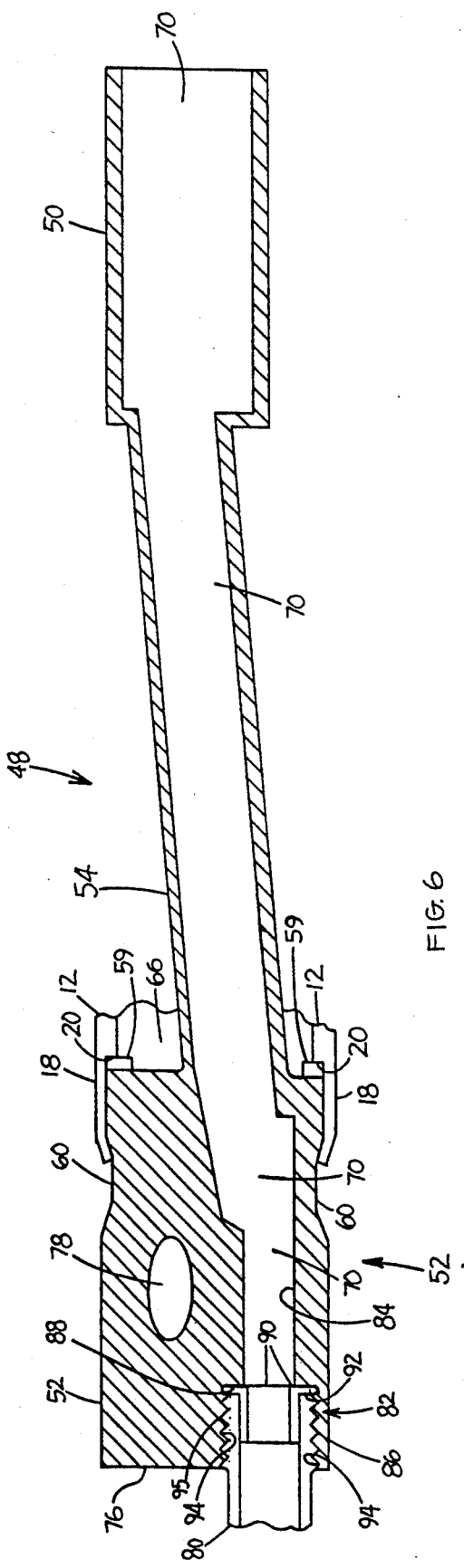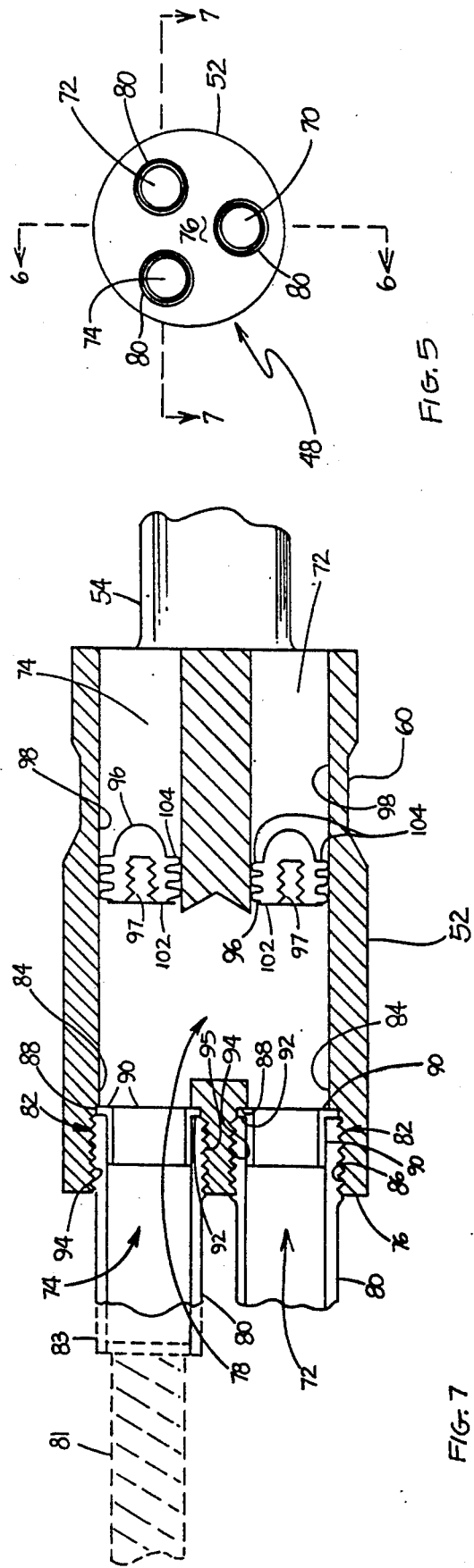

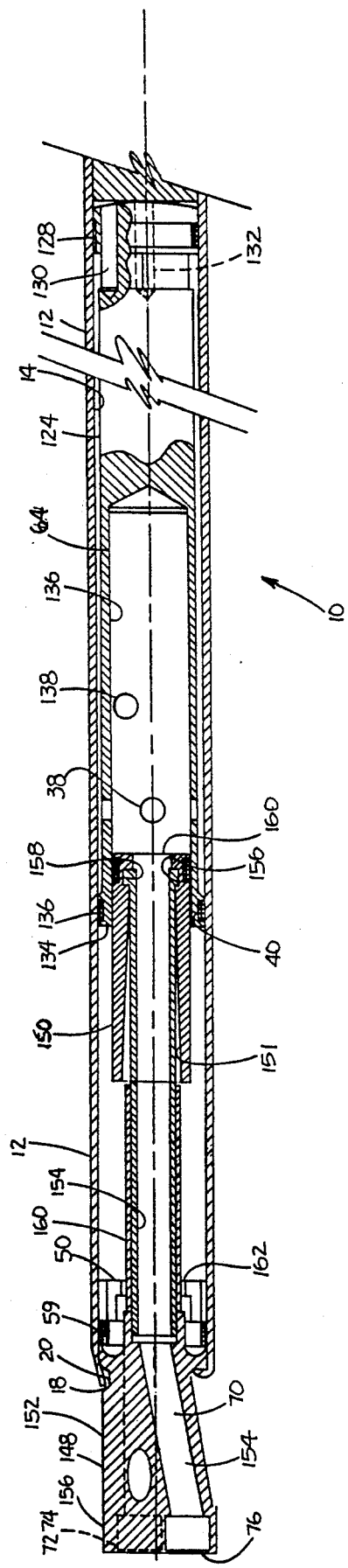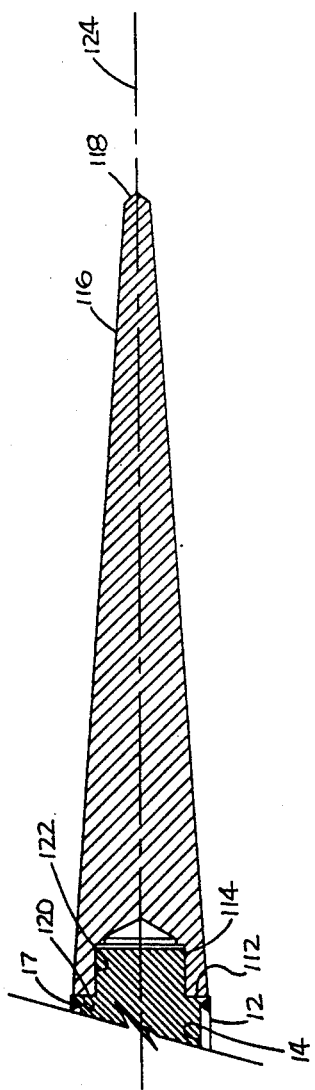
FIG. 11

METHOD FOR EMBEDDING LINES, ANCHORING CABLES, AND SINKING WELLS

BACKGROUND OF THE INVENTION

The present invention pertains to impact borers for earth boring, to connectors, and to boring and drilling methods, and more particularly pertains to an impact borer, a connector, a method for embedding lines, anchoring cables, and sinking geothermal wells.

Impact borers push through soil by means of an internal, air-operated hammer, which impacts against the body of the tool. The impacts move the tool forward incrementally, compacting and displacing soil and creating a tunnel. After tunneling, an impact borer may be recovered from the exit end of the tunnel. Recovery at the entry end is difficult or impossible in many instances, since an impact borer usually cannot be reversed and cannot be pulled backward out of a tunnel more than a few feet long.

Impact borers have commonly been used to tunnel horizontally under roads or other obstructions. After an impact borer has tunneled through to an exit pit or the surface, the borer is removed and detached from its supply hoses. Access is then available to the tunnel at either end, and pipe or conduit may be drawn through the tunnel.

Impact borers have had the shortcomings of being complex and expensive. This limits use to situations in which recovery is likely. This presents a barrier to use of impact borers for embedding lines such as guy wires and anchoring cables, sinking wells, and the like.

Use of an impact borer in any but a horizontal direction has been extremely inadvisable, since even when used horizontally, the direction of travel of an impact borer has not been entirely predictable. Encountered rocks can redirect or stop an impact borer, which must then be located and dug up for another try. Boundaries between soil layers, for example, between a layer of clay and a layer of sand, can have the same effect. Directing an impact borer downwardly rather than horizontally has presented a considerable risk of the borer stopping at an insufficient depth or turning and traveling horizontally in an unknown direction at an unknown depth.

It also has not been feasible to make impact borers or other implements subject to repeated impacts or very rough usage, or to join very high molecular weight polyethylene pipe to ultra high molecular weight polyethylene. Very high molecular weight (VHMW) polyethylene is strong and resistant to abrasion and degradation and is a material commonly used for pipe used in geothermal wells. Ultra high molecular weight (UHMW) polyethylene is an even tougher material used for some mechanical components. VHMW and UHMW polyethylene components may be weakly fused together by heating and then pressing the components together. However, it has not been feasible to join VHMW and UHMW polyethylenes in highly stressed or pressurized pipe joints, such as the joint between a VHMW pipe and a UHMW impact borer component which must withstand pulls exceeding the tensile strength of VHMW polyethylene. Another problem of such joints is that heated VHMW polyethylene pipe, upon insertion into a UHMW component tends to flow excessively and cause a partial blockage.

Commonly used well sinking methods such as forcing a bit forward with a jack or the weight of a pipe string or pulling pipe with a screw or a rearwardly directed jet have a variety of shortcomings. Many methods require heavy, rigid pipe strings. Some methods are limited to vertical use. Other methods are limited to particular soil types or depths. Impact driver methods, as noted above, are generally impractical for non-horizontal use. The greatest majority of methods require large, heavy machinery at the bore site.

These various shortcomings present a major problem in embedding lines, anchoring cables, and sinking wells including geothermal wells, i.e., wells used as heat sinks for heat pumps used for space heating and cooling and the like. In order to prevent ground water contamination, geothermal wells are generally required to limit circulation of water or other fluid to a closed loop of pipe. Plastic (VHMW polyethylene) pipe for that purpose is commonly dropped down vertical wells after drilling is completed. For practical reasons, a series of relatively shallow wells are generally dug rather than a single deep well. Generally, 150 feet of well is required for each ton of air conditioning. The individual wells are separated by a few feet to ensure that the "heat sinks" of soil surrounding each well do not significantly overlap. Pipe must be laid between each of the wells and a junction, which communicates with the heat pump. These connecting pipes must be buried or must be insulated to maintain system efficiency. Horizontal space taken up by the system is not small. This may not be critical in new construction, but along with space requirements of drilling equipment may preclude use in retrofitting existing buildings.

It is therefore highly desirable to provide an improved impact borer, an improved connector, an improved method for embedding lines, anchoring cables, and sinking wells.

It is also highly desirable to provide an improved impact borer, an improved connector, an improved method for embedding lines, anchoring cables, and sinking wells in which an impact borer is so inexpensive as to permit nonrecovery after use.

It is also highly desirable to provide an improved impact borer, an improved connector, an improved method for embedding lines, anchoring cables, and sinking wells effective in nonhorizontal use.

It is also highly desirable to provide an improved impact borer, an improved connector, an improved method for embedding lines, anchoring cables, and sinking wells in which pipes connected to the impact borer may be converted into a closed loop within a bore-hole.

It is also highly desirable to provide an improved impact borer, an improved connector, an improved method for sinking wells which provide an effective connector between VHMW and UHMW polyethylenes, such that VHMW polyethylene well pipe may be sunk by use of an impact borer.

It is also highly desirable to provide an improved impact borer, an improved connector, an improved method for embedding lines, anchoring cables and sinking wells which eliminates need for drilling rigs, tolerates space requirements and existing landscaping and buildings, reduces installation time and is ecologically preferable when compared to prior art apparatus and methods.

It is finally highly desirable to provide an improved impact borer, an improved connector, an improved method for embedding lines, anchoring cables, and sinking wells which meet all of the above desired features.

SUMMARY OF THE INVENTION

It is an object of the invention to provide an improved impact borer, an improved connector, an improved method for embedding lines, anchoring cables, and sinking wells.

It is another object of the invention to provide an improved impact borer, an improved connector, an improved method for embedding lines, anchoring cables, and sinking wells in which an impact borer is so inexpensive as to permit nonrecovery after use.

It is another object of the invention to provide an improved impact borer, an improved connector, an improved method for embedding lines, anchoring cables, and sinking wells effective in nonhorizontal use.

It is another object of the invention to provide an improved impact borer, an improved connector, an improved method for embedding lines, anchoring cables, and sinking wells in which pipes connected to the impact borer may be converted into a closed loop within a bore-hole.

It is another object of the invention to provide an improved impact borer, an improved connector, an improved method for sinking wells which provide an effective connector between VHMW and UHMW polyethylenes such that VHMW polyethylene well pipe may be sunk by use of an impact borer.

It is another object of the invention to provide an improved impact borer, an improved connector, an improved method for embedding lines, anchoring cables, and sinking wells which eliminates need for drilling rigs, tolerates space requirements and existing landscaping and buildings, reduces installation time and is ecologically preferable when compared to prior art apparatus and methods.

It is finally an object of the invention to provide an improved impact borer, an improved connector, an improved method for embedding lines, anchoring cables, and sinking wells which provide all of the above objects.

In the broader aspects of the invention there is provided an impact borer, a connector, a method for embedding lines and an improved method for sinking geothermal wells. The impact borer has a shell, which has a longitudinal bore. An anvil closes one end of the bore. A ram is reciprocally slideable within the bore, against and away from the anvil. The ram divides the bore into front, rear, and ram chambers. A director is joined to the shell. The director is monolithic. The director isolates the front and rear chambers in alternation upon reciprocation of the ram. The director defines an inlet passage communicating with the ram chamber and an outlet passage communicating with the rear chamber.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 5 is a rear plan view of the manifold of FIG. 1.

FIG. 6 is a cross-sectional view of the manifold of FIG. 1 taken substantially along section line 6—6 of FIG. 5. One of the lines and the shell are shown in partial cross-section.

FIG. 7 is a partial cross-sectional view of the director of FIG. 1 taken substantially along section line 7—7 of FIG. 5. Two of the lines are shown in partial cross-section. Dashed lines illustrate an alternative embodiment of the impact borer of the invention, in which a solid line replaces a hollow line.

FIG. 11 is a cross-sectional view of the impact borer of the invention illustrating a modification of the guide and ram and anvil.

DESCRIPTION OF A SPECIFIC EMBODIMENT

Figure 1:
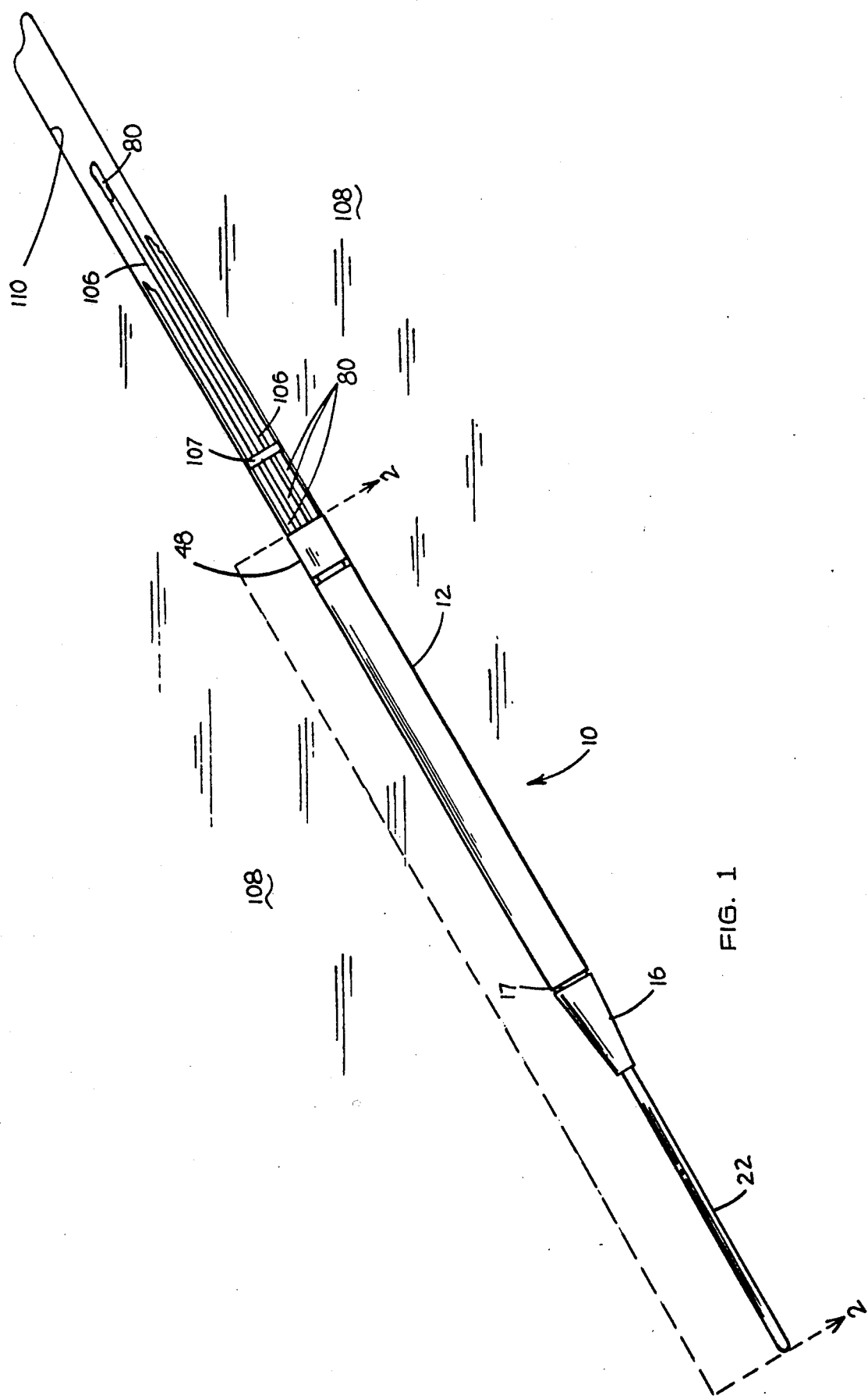
FIG. 1 is a side plan view of an embodiment of the impact borer of the invention, which includes the connector of the invention, within a bore-hole.

Referring now to FIGS. 1-4, the impact borer 10 of the invention is shown to have a shell 12, which has a hollow cylinder or tube 15, surrounding a longitudinal cylindrical bore 14, closed at one end by a tapered nose or anvil 16. An open rear end 18 is slightly tapered. Shell 12 may have a separate anvil 16 and tube 15 joined together by fastening means such as a weld 17 or may be monolithic. Shell 12 is made out of heavy steel or other equivalent material and is thickened at anvil 16, so as to withstand extensive hammering through soil without deformation. Referring now to FIG. 6, in a particular embodiment of impact borer 10, the thickness of shell 12 is reduced at rear end 18 to define a circumferential ledge 20 encircling bore 14.

Referring again to FIGS. 1-4, extending forward from nose 16 is an elongate spike 22, which is made of steel or other material able to resist deformation during use. Spike 22 is joined to the center of anvil 16 and is generally coaxial with shell 12. In a particular embodiment of the impact borer 10 of the invention, spike 22 has a longest dimension, between about half the length of shell 12 and about the same length as shell 12. In that embodiment, for example, an impact borer 10 may have a shell 12 about 3 feet long and 2 to 3 inches in diameter and may have a conical nose 16 of about 1½ to 3 feet long and ⅞ inches in diameter at the tip or distal end.

Figure 8:
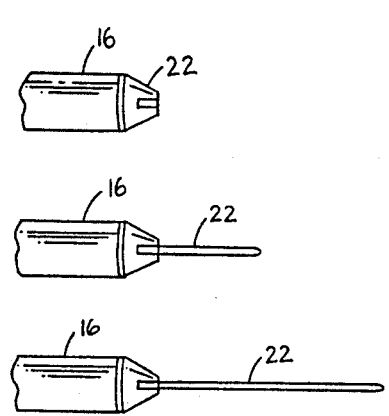
FIG. 8 is a partial side plan view of three alternative embodiments of the impact borer of the invention illustrating modified spikes.

The embodiment of impact borer 10 shown in FIG. 1 has a spike which is preferred for use in soils having layers of differing consistency. An impact borer 10 is used for a limited purpose, such as horizontal boring or boring in uniform or relatively uniform soil, would not be appreciably hindered by a shorter spike 22 or a tapered nose 16 lacking a spike 22, as shown in FIG. 8. The alternative embodiment of impact borer 10 shown in FIG. 8 has spike 22 threaded to anvil 16 (threads are not illustrated), for removal and replacement with alternative spikes 22 of different lengths depending upon soil characteristics.

Within bore 14 is a ram 24, which has a ram body 26 and discrete front and rear spacers 28, 30, respectively. Ram body 26 is made of steel or other equivalent material, which will not deform during use. Ram body 26 is cylindrical or roughly cylindrical and is continuously spaced apart from shell 12 by spacers 28, 30. Ram body 26 is massive with a solid front 32 and a hollow rear 34, defining a rearwardly opening ram chamber 36. Ram chamber 36 is coaxial with ram body 26 and is cylindrical. A series of apertures 38 extend through ram body 26 slightly forward of rear opening 40. In a particular embodiment of the impact borer 10 of the invention, three or four apertures 38 are spaced apart around ram body 26 equally distant from rear opening 40.

Figure 2:
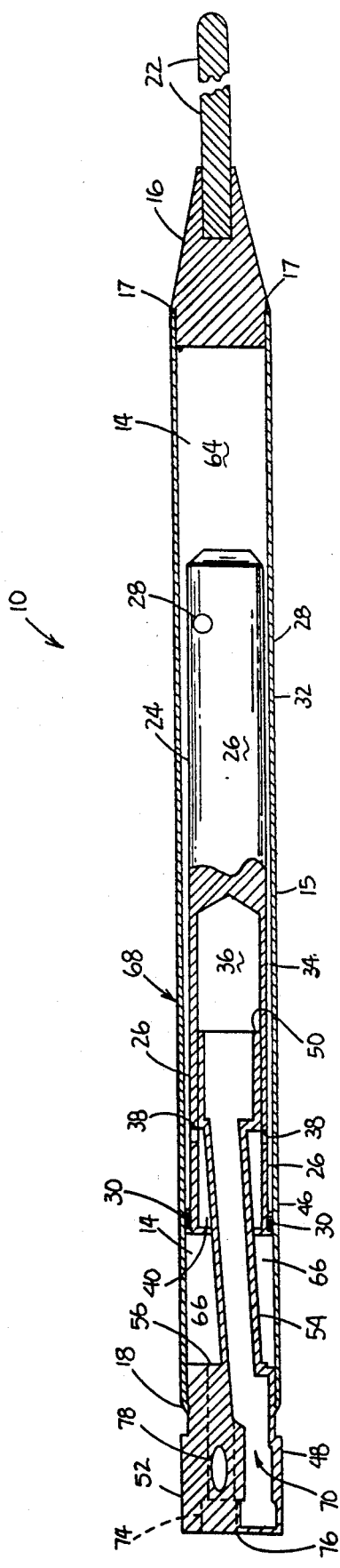
FIG. 2 is a cross-sectional view of the impact borer of FIG. 1 taken substantially along section line 2—2 of FIG. 1, showing the ram, in partial cross-section, in a rear position. Pipes or lines, shown in FIG. 1 joined to manifold, are deleted in this figure.
Figure 3:
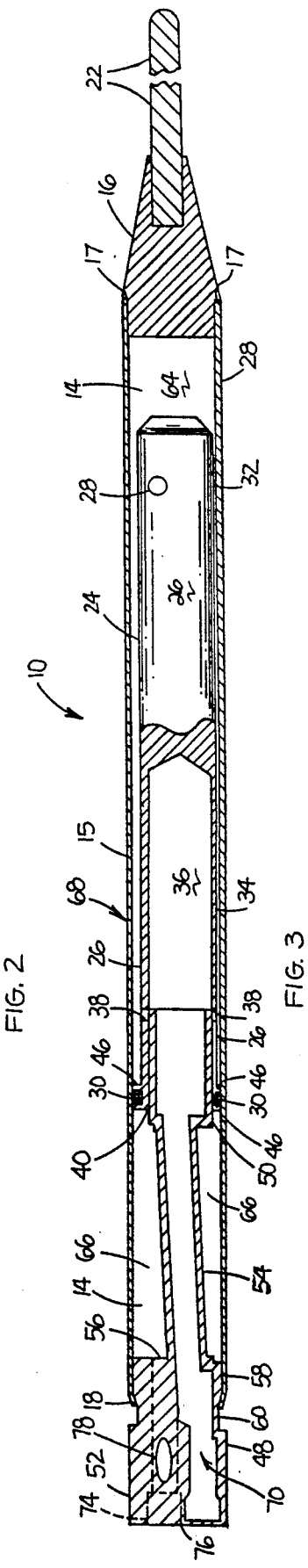
FIG. 3 is the same view as FIG. 2, showing the ram, in partial cross-section, in an intermediate position.
Figure 4:
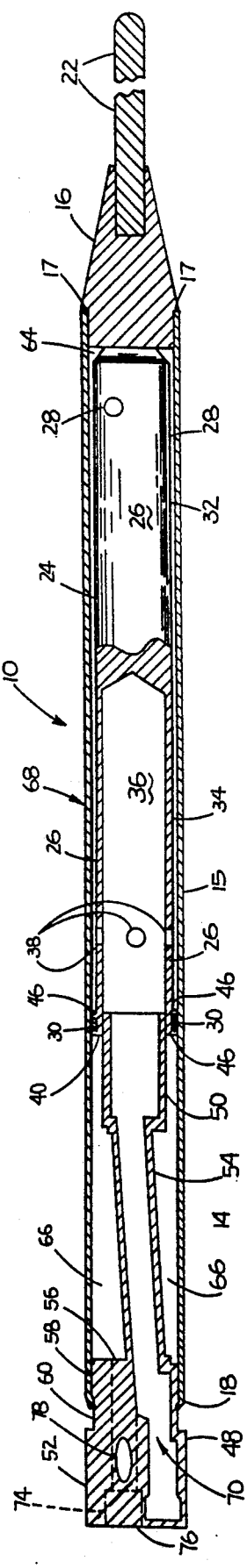
FIG. 4 is the same view as FIGS. 2 and 3, showing the ram, in partial cross-section, in a front position.

Spacers 28, 30 extend out from ram body 26 and contact and are slideable along shell 12. Spacers 28, 30 are made of low friction material such as UHMW polyethylene. Front spacers 28 extend out radially from front 32 of ram body 26. In a specific embodiment of impact borer 10, front spacers 28 are three or four in number and are distributed about ram body 26 so as to retain ram body 26 in coaxial relation to shell 12. Rear spacer 30 is annular in shape and encircles rear 34 of ram body 26. Rear spacer 30 is disposed between a pair of flanges 46, which extend out from ram body 26. The radial dimension of flanges 46 relative to ram body 26 is less than the equivalent dimension of rear spacer 30, ensuring that flanges 46 do not contact shell 12. Spacers 28, 30 are slideable along shell 12 and ram 24 is movable axially and reciprocally along bore 14 against and away from anvil 16, as illustrated in FIGS. 2-4.

Referring now to FIGS. 2-7, a director 48 is joined to rear end 18 of shell 12. Director 48 has a guide 50 and a manifold 52. Guide 50 is a hollow cylinder, which is fit within ram chamber 36. Guide 50 is coaxial with and complementary in cross-section to ram chamber 36. Guide 50 and ram body 26 are in slideable relation in the manner of a piston and cylinder. Ram chamber 36 and guide 50 are disclosed as cylindrical, however, alternative shapes of uniform radial cross-section are also usable in specific embodiments of impact borer 10.

Manifold 52 has an inlet tube 54 and a primary section 56. Inlet tube 54 connects guide 50 and primary section 56 in air-tight relation. Inlet tube 54 is hollow and may be offset from or coaxial with ram 24 and guide 50, as desired. The exterior radial cross-section of inlet tube 54 adjacent guide 50 is smaller than the exterior radial cross-section of guide 50. Primary section 56 is generally cylindrical in cross-section throughout tapering from front 58 to a narrower cross-section at waist 60. Front end 58 is complementary to and gripped in air-tight relation by tapered rear end 18 adjoining ledge 20 of shell 12. A washer 59 is disposed between ledge 20 and manifold 52. In a preferred embodiment of the impact borer 10 of the invention, director 48 is monolithic. Director 48 may, for example, be constructed of a single piece of UHMW or VHMW polyethylene.

Rear spacer 30 and ram body 26 divide bore 14 into a front chamber 64, ram chamber 36 and a rear chamber 66. Front chamber 64 is forward of rear spacer 30 and is bounded by shell 12, ram body 26 and rear spacer 30. Rear chamber 66 is rearward of rear spacer 30 and is bounded by rear spacer 30, ram body 26, director 48 and shell 12. The separation of apertures 38 from rear opening 40 and the length of guide 50 is selected such that guide 50 isolates front and rear chambers 64, 66 in alternation upon reciprocation of ram 24, as illustrated in FIGS. 2-4. Compressed air follows a circulation path through guide 50 into ram chamber 36, then into front chamber 64, then into rear chamber 66 and out through manifold 52. Guide 50 and ram 24 together constitute an air drive 68, which, when supplied with compressed air by manifold 52, actuates ram 24 which repeatedly hammers anvil 16.

Figure 9:
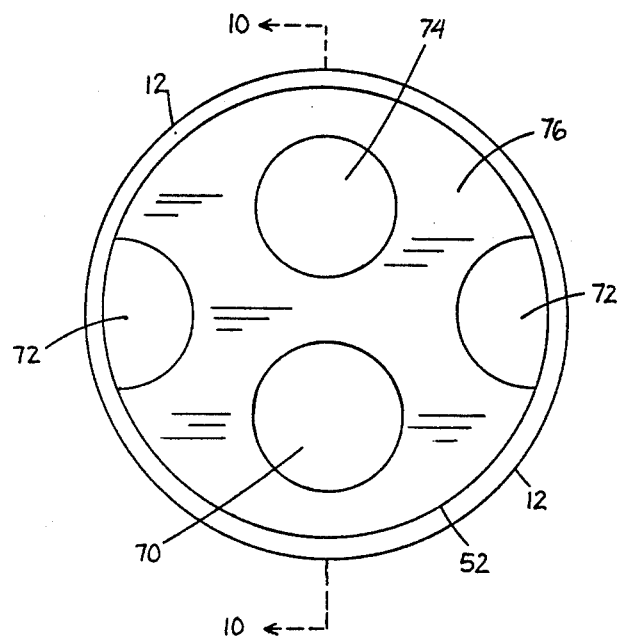
FIG. 9 is a rear plan view of an alternative embodiment of the impact borer of the invention.
Figure 10:
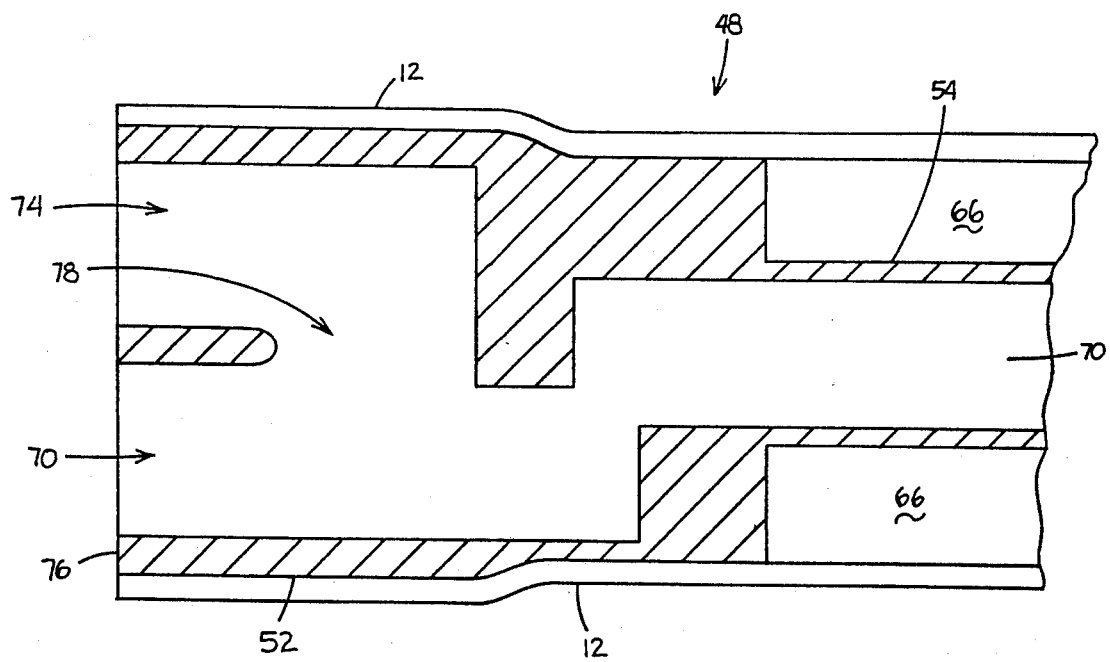
FIG. 10 is a cross-sectional view of the impact borer of FIG. 1 taken substantially along section line 2—2 of FIG. 1, showing an alternate construction to that shown in FIGS. 2, 3, and 4. Like FIGS. 2, 3, and 4, pipes or lines, shown in FIG. 1 joined to the manifold are deleted or clarity.

Director 48 has an inlet passage 70, an outlet passage 72 and a duplicate passage 74. Inlet passage 70 extends from the back 76 of manifold 52, through inlet tube 54 and guide 50 to ram chamber 36. Outlet passage 72 extends from back 76 to rear chamber 66. Duplicate passage 74 extends in from back 76 and communicates with either inlet passage 70 or outlet passage 72 through an interconnection 78 within manifold 52, as desired. In a preferred embodiment of the impact borer 10 of the invention, duplicate passage 74 replicates and communicates with outlet passage 72. In an alternative embodiment of impact borer 10 shown in FIGS. 9-10, duplicate passage 74 replicates the posterior part of inlet passage 70 and communicates with ram chamber 36 through interconnection 78.

Referring now to FIGS. 1 and 5-7, before use, impact borer 10 is assembled by connecting lines 80 to respective passages 70, 72, 74. All embodiments of the impact borer 10 of the invention need at least one pipe 80 is connected to inlet passage 70 and one of outlet passages 70 or 72, respectively, in order to carry and exhaust the compressed air to operate impact borer 10. A pipe 80 connected to inlet passage 70 is preferred for efficient operation of impact borer 10. Connection of additional lines 80, either solid or hollow, cables or pipe, depends upon the intended use of impact borer 10. In a particular embodiment of the impact borer 10 of the invention used to sink geothermal wells, hollow lines or pipes 80 are connected to both interconnected passages 72, 74. It is preferred that VHMW polyethylene pipes be connected to impact borer 10 with the connector 82 of the invention. In an alternative embodiment of impact borer 10 used to anchor a cable, one of lines 80 joined to interconnected passages 72, 74 is a cable. In another alternative embodiment of impact borer 10 used to sink a traditional well, a pourous pipe 81 is joined directly to passages 72 or 74 or to a short, blind section of pipe 83 (see FIG. 7) fitted to one of connectors 82.

Referring now particularly to FIGS. 5-7, connector 82 of the invention utilizes manifold 52 as a connector body and functions to connect a plurality of hoses or pipes 80 to manifold 52 in a manner by which the connector can withstand pulls of borer 10 and in some cases, pulls exceeding the breakage strength of the hoses 80 or the manifold 52. If utilized separately from impact borer 10, the body of connector 82 may be configured differently, as desired. Connector 82, as shown, has one or more passages 70, 72, or 74 with an inward portion 84 and an outward and enlarged portion or receiver 86. Outward portion 86, as illustrated, adjoins back 76 of manifold 52. Inward portion 84 adjoins outward portion 86. Inward portion 84 has a smaller cross-section than outward portion 86 defining an annular ledge 88 where inward and outward portions 84, 86 meet. A cylindrical sleeve 90, which has an outwardly directed flange 92 at one end is inserted within outward portion 86. Flange 92 is intermediate in size in cross-section between inward portion 84 and outward portion 86 and is positioned with flange 92 adjacent ledge 88. The ends of pipes 80 are disposed within outward portion 86, and pressed between sleeve 90 and manifold 52.

In a particular embodiment of connector 82, outward portion 86 is grooved or threaded and sleeve 90 and outward portion 86 have a diameter about the same as the inside and outside of pipe 80, respectively. In one embodiment, pipe 80 is VHMW polyethylene and manifold or body 52 is UHMW polyethylene and sleeve 90 is stainless steel. Sleeve 90 is positioned on the VHMW polyethylene pipe 80 and pipe 80 is heated prior to insertion, and deformed into grooves 94, 95 and about back 76 of manifold or body 52 prior to cooling. Connector 82 prevents any occlusion of passage 70, 72, or 74 during insertion of heated pipe 80. Interlocking ridges 95 of pipe 80 and grooves 94 of body 52, shown in FIGS. 6-7, hold pipes 80 in manifold 52 so as to withstand pulls exceeding the tensile strength of VHMW polyethylene.

In particular embodiments of the impact borer 10 of the invention, impact borer 10 is modified after tunneling, by the insertion of a plug 96 in each interconnected passage 70, 72, 74 that is not blind to isolate passages 70, 74 or 72, 74 from bore 14. In one embodiment of impact borer 10, each passage 70, 72, 74 to be plugged has a neck 98 forward of interconnection 78. Neck 98 is smaller in cross-section than the rearward parts of passage 70, 72, 74. Each plug 96 is configured so as to pass freely through pipe 80 and passage 70, 72, 74 until encountering neck 98 and then to jam and to occlude passage 70, 72, 74. In another embodiment of impact borer 10 in which interconnected passages 70, 74 or 72, 74 extend through manifold 52 and carry exhaust air, two plugs 96 are used. Each passage 70, 72, 74 to be plugged should not have internal flashing or other occluding scrap. In a particular embodiment of the impact borer 10 of the invention using VHMW polyethylene, unintended occlusion of passages 70, 72, 74 is prevented by use of the connector 82 of the invention. In a particular embodiment of the invention, plugs 96 can take the form of resilient balls of a diameter larger than passages 70, 72 and 74, respectively.

In another embodiment, each plug 96 has a main section 102, which is conical or bullet shaped and passages 72 and 74 are provided in a diameter smaller than sleeves 90. One or more circumferential flanges 104 each having a diameter larger than sleeves 90 surround main section 102. In all embodiments, plugs 96 may be provided with threaded holes 97, to permit removal, after installation, by threading a threaded rod (not shown) into holes 97 and removing the unwanted plug. Removal of plugs 96 may also be effected, if an unblocked pipe 80 is available, by pressurizing passages 70, 72, 74 below plugs 96, to blow out the unwanted plug 96.

In a specific embodiment of a geothermal well, passage 70 is used to supply incoming air and passages 72 and 74 are used to exhaust air during drilling. Afterwards, passages 72 and 74 are plugged, and passages 72, 74 and interconnection 78 is used to circulate fluid, as desired. Passage 70 remains unplugged and is capped so as to be useful, at a later time, to blow plugs 96 free or to otherwise clear passages and maintain passages 72, 74.

An alternate construction of the impact borer 10 is shown in FIG. 11. As hereinabove, like structure will be given like reference numerals.

The impact borer 10 as shown in FIG. 11 has a shell 12 in the form of a hollow cylindrical tube 15 surrounding a longitudinal cylindrical bore 14. The longitudinal bore 14 is closed at one end by a nose back 112 secured to the shell 12. In one example, nose back 112 is secured to shell 12 by welding. Nose back 112 has a distal end 114 which is threaded to receive a nose front 116. Nose front 116 has a tapered, distal end 118 and a blunt opposite end 120.

In a specific embodiment, a bore 122 is centrally located in blunt end 120 for securing nose front 116 to nose back 112. Bore 122 is threaded so as to receive the threads of distal end 114 of nose back 112. In this manner, nose fronts 116 of different shapes can be secured to the shell 12.

Nose front 116, as shown in the specific embodiment illustrated in FIG. 11, is tapered from distal end 118 to blunt end 120 to provide a smooth conical taper from distal end 118 to the cylindrical exterior shape of shell 12. As before described, the specific exterior shape of nose front 116 may vary with soil types through which the impact borer 10 will desirably travel as indicated by a core taken prior to use in the specific vicinity at which the impact borer will be utilized.

Nose back 112 functions as anvil 16, and thus, in a specific embodiment, is made of heavy steel or other equivalent material so as to withstand extensive hammering without deformation. Shell 12, nose back 112, and nose front 116 are all coaxially aligned along axis 124.

Within bore 14 is a ram 124 with a ram body 126 which, like ram body 26, is made of steel or other equivalent material which will not deform during use. Ram body 126 is cylindrical or roughly cylindrical in shape, and is positioned in a spaced apart relation with shell 12 by front 128 and rear spacers 30 within bore 14.

In a specific embodiment, front spacer 128 is a band of wear-resistant, self-lubricating material, which in a specific embodiment is ultra-high, molecular weight polyethylene. Front spacer 128 is both like rear spacer 30 and is contained within flanges like flanges 46. Ram front 130 communicates with ram chamber 136 through holes 38 and groove 131 and apertures 132.

Ram body 126 has a bore or ram chamber 136 therein extending coaxially of ram 126 from hollow rear 134 forwardly toward ram front 130. A series of apertures 38 extend through ram body 126 into ram chamber 136 slightly forward of rear 134. In a specific embodiment of the impact borer 10 of the invention, four apertures 38 are spaced around the ram body 126 equally distant from rear 134 and rear opening 40.

Spacers 130 and 128 extend out from ram body 126 and contact shell 12. Spacers 30 and 128 retain ram body 126 in an essentially coaxial relation to shell 12 such that ram 126 can move axially and reciprocally within borer 14 against and away from nose back 112 as previously described with regard to ram 26 and anvil 16.

An additional control opening 138 is positioned in ram body 136 forward of apertures 38. This control opening is selectively positioned so as to control the amplitude of the movement of ram 136 within borer 14.

In a specific embodiment in which ram 126 is about 20.5 inches in axial length, control opening 138 is of the same size as apertures 38. i.e., one-half inch, and openings 38 are positioned $2\frac{3}{4}$ inches from rear opening 40 and control opening 138 is positioned $5\frac{1}{4}$ inches from rear opening 40.

Director 148 is joined to rear end 18 of shell 12. Director 148 has a guide 150 and a manifold 152. Guide 150 is a cylindrical member positioned within ram chamber 136. Guide 150 is coaxial with and complementary in cross-section to ram chamber 136. Guide 150 and ram body 126 are in slideable relation in the manner of a piston and cylinder. In a specific embodiment, a seal 159 may be positioned between guide 150 and ram 126 adjacent distal end 160. Ram chamber 136 and guide 150 are disclosed as cylindrical, however, alternative shapes of uniform radial cross-section are also usable in specific embodiments of impact borer 10.

Manifold 152 has an inlet tube 154 and a primary member 156. Inlet tube 154 is hollow and may be offset from or coaxial with guide 150, as desired. The exterior radial cross-section of inlet tube 154 adjacent guide 150 is smaller than the exterior radial cross-section of guide 150 such that inlet tube 154 can be positioned within the interior 151 of guide 150 and secured thereto. The interior 151 of guide 150 is tapered rearwardly toward ram 136. In cross-sections taken generally perpendicularly of the axis 124, the interior 151 of guide 150 is shown to be circular but of increasingly larger diameters the further the cross-section is taken from nose back 112. The interior 151 of guide 50 thereby defines a conical shape.

Adjacent the distal end 160 of guide 150 is positioned an interior cylindrical groove 158. Inlet tube 154 has a distal cylindrical rim 156 adjacent its distal end 162 loosely positioned in groove 158. Rim 156 and groove 158, in a specific embodiment, are geometrically similar to each other, and function to connect inlet tube 154 to guide 150 and to allow inlet tube 154 to pivot with respect to guide 150 between opposite engagements of interior 151 of guide 150 in all directions transverse of axis 124 as guide 150 moves relative to ram 126. See FIG. 4.

Rear spacer 30 and ram body 126 divide bore 14 into a front chamber 64, a ram chamber 36, and a rear chamber 66 as aforedescribed with regard to ram body 26. Again, the separation of apertures 38 from the rear 134 of ram 126 and the length of guide 150 is selected such that guide 150 isolates front rear chamber 64, 66 in alternation upon reciprocation of ram 24 as illustrated in FIGS. 2-4. Compressed fluid, such as air, follows a circulation path through guide 150 into ram chamber 136 and then into front chamber 64, then into rear chamber 66 and out through manifold 152 as ram reciprocates within shell 12 against and away from nose back 112. Guide 150 and ram 124 together constitute an air drive 68, which, when supplied with compressed fluid by manifold 152, actuates ram 124 to repeatedly hammer the nose back 112. Openings 38 and control opening 138 define the length of the stroke of ram 124 as it repeatedly hammers anvil 16. The movement between guide 150 and inlet tube 154 accomodates for any misalignment therebetween.

Director 148 has an inlet passage 70. Manifold 152 has an outlet passage 72, and a duplicate passage 74, and thus, director 148 is no different in these regards from director 48. In a preferred embodiment of the director 148 and the guide 150, director 148 is molded of conventional VHMW polyethylene, inlet tube 154 is of a conventional VHMW polyethylene tubing with a molded ridge 156 at its distal end 160. Inlet tube 154 is joined to director 148 by welding techniques well known to persons skilled in the art.

Surrounding inlet tube 154 between director 148 and guide 150 is a support tube 170. Support tube 170 may also be formed of VHMW polyethylene and is provided to strengthen inlet tube 154 between manifold 152 and guide 150. Surrounding both support tube 170 and inlet tube 154 and joined to director 148 is an alignment ring 172. Alignment ring 172 is formed to have close tolerances with support tube 170 and the interior of shell 12 to coaxially position inlet tube 154 with regard to axis 124. In a specific embodiment, ring 172 is a metallic ring machined to have the desired tolerances. Shell 12 is crimped against ring 172 with seal 59 therebetween to provide an appropriate seal between director 148 and shell 12.

In use, impact borer 10 as shown in FIG. 11 is assembled as described hereinabove with reference to FIGS. 1 and 5-7, and used as described hereinabove with regard to the impact borer 10 therein illustrated and having manifold 152 instead of manifold 52. Pipes 80 are connected to manifold 152 by welding in a specific embodiment in which both pipes 80 and manifold 152 are of VHMW polyethylene material thereby eliminating the need of connectors 82. After tunneling, passages 70, 72 and 74 can be plugged by plugs 96 as desired and used in accordance with the method of the invention.

In the method of the invention, impact borer 10 is joined to lines 80 of the type required and impact borer 10 is connected to an air compressor (not shown). Impact borer 10 is then manually partially embedded in the ground surface and supported in place, if necessary. The air compressor is actuated and compressed air is supplied to borer 10 through one or more of the lines 80, causing impact borer 10 to embed itself (as described above) into soil 108 and to pull lines 80 thereafter. Impact borer 10 can tunnel at any angle, however, angles of between about 30 degrees and about 45 degrees downwardly from the vertical are advantageous, since at those angles, encounters of impact borer 10 with rocks are less likely to stop, rather than redirect, impact borer 10. After a desired length of lines 80 has been embedded, compressed air is shut off. Lines 80 are then usable. Impact borer 10 is not recovered.

A variety of lines 80 can be pulled. Lines 80, once in place, are extremely difficult or impossible to remove from the bore hole. Thus, after embedding solid lines or cables 80, borer 10 is usable as a cab e anchor. A pipe with a porous section 81 can be used to provide a traditional well. Imperforate pipe can be used to provide geothermal wells or conduit.

Lines 80 are desirably flexible, both because as a practical matter it is generally easier and cheaper to use a continuous coil of flexible line rather than relatively short lengths of rigid line and because rigid line would inhibit impact borer 10 from deflecting slightly around rocks and obstructions during sinking. Some lines 80 will also exhibit significant friction with the wall of the bore hole during sinking. For example, some VHMW polyethylene pipe is flexed in a sinusoidal configuration as it is sunk, because the pipe is insufficiently limp to completely uncoil. In a particular embodiment of the method for embedding lines of the invention, bore hole is backfilled with fluid bentonite during sinking, which reduces friction between lines 80 and the bore hole wall and prevents communication between aquifers that are penetrated.

Referring now to FIG. 1, a backfill pipe 106 is joined to pipes 80 by a yoke 107, a short distance behind manifold 52 and backfill material (not shown) is pumped through backfill pipe into tunnel. A column of backfill material, above impact borer 10, is maintained at a roughly constant level by continuing to add additional material during sinking.

In a particular embodiment of the method, geothermal wells are sunk in accordance therewith. A drilling site is first prepared by removing hard materials from an area of ground surface about six inches in diameter for each well. Above ground access to drilling site may be partially obstructed, as long as individual access is provided for each impact borer 10 at an appropriate angle. A series of wells are then sunk as described above for the method of embedding lines of the invention. Each well is desirably at an angle between about 30 degrees and about 45 degrees downward from vertical. Wells are distributed about the periphery of the drilling site and are angled outwardly in order to maximize the separation of well bores. After tunneling, with an appropriate embodiment of impact borer 10, interconnected passages 70, 74 or 72, 74 are plugged by inserting one or more plugs 96 in respective pipes 80 and then supplying compressed air to those pipes 80 to seat the plugs 96. Each well then is a closed loop through which fluid from a heat pump can be circulated. Wells are easy to interconnect, since pipes for all wells emerge within the confines of the drilling site. If desired, bore hole 110 is backfilled during tunneling in the manner described above in relation to the method of embedding lines. The backfill material repels and has a greater specific gravity than water. An example of such a material is a hydrated mixture of about 8.5-9.0 pounds of bentonite per gallon of water. Besides preventing pipes 80 from binding within bore hole 110, the backfill mixture fills bore hole behind impact borer 10 to help prevent ground water contamination.

The inventions described herein are indicated as utilizing compressed air. Other fluids may, however, be substituted. In a preferred embodiment of the impact borer 10 of the invention described herein, compressed air or other gas may be directed from exhaust passage 72 to an exhaust pipe 80, rather than the well bore. This containment makes practical activities such as exhaust gas recycling.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto.

What is claimed is:

1. A method for embedding lines for a stated purpose comprising the steps of joining at least one line and an impact borer into a connected condition, sinking said impact borer into the ground to create a bore hole, pulling said at least one line into the ground along said bore hole during said sinking step by said impact borer, retaining said impact borer and said at least one line permanently within said bore hole in said connected condition, and utilizing said retained line both during and after performing said sinking and pulling steps, said after performing utilizing being for said purpose.

2. The method of claim 1 wherein said sinking step further comprises the steps of supplying actuating fluid flow to said impact borer along a circulation path extending through said at least one line and ceasing to supply actuating fluid flow to said impact borer.

3. The method of claim 1 wherein said joining step further comprises joining a plurality of lines to said impact borer, and wherein said sinking step further comprises supplying actuating fluid to said impact borer along a circulation path extending through more than one of said lines, and ceasing to supply actuating fluid to said impact borer after the completion of said sinking and pulling steps.

4. The method of claim 3 further comprising the step of blocking actuating fluid flow to said impact borer and linking two of said lines in a circulation path loop.

5. The method of claim 1 wherein said impact borer is sunk at an angle of between about 30 degrees and about 45 degrees from horizontal.

6. The method of claim 1 wherein said joining step further comprises joining a pair of pipes to said impact borer, and interconnecting said pipes in a parallel functional relation along a circulation path including said impact borer.

7. The method of claim 6 further comprising the step of blocking circulation extraneous to said interconnected pipes following said pulling step.

8. The method of claim 1 further comprising the step of backfilling during said sinking step.

9. The method of claim 8 wherein said backfilling step further comprises backfilling said bore hole with a backfill material repellent of water and having a greater specific gravity than water.

10. The method of claim 8 wherein said backfilling step further comprises backfilling said bore hole with bentonite.

11. A method for sinking geothermal wells comprising the steps of joining a pair of pipes to an impact borer into a connected condition, said pipes being interconnected in a parallel functional relation along a circulation path necessary for the actuation of said impact borer, supplying compressed fluid to said impact borer along said circulation path to sink said impact borer into the ground and create a bore hole, pulling said pipes into said ground along said bore hole by said impact borer during said sinking step, blocking actuation of said impact borer, retaining said impact borer and said pipes within said bore hole in said connected condition permanently, and utilizing said pipes both during and after performing said supplying and pulling steps, said after performing utilizing of said pipes being as a geothermal well.

12. The method of claim 11 further comprising, following said pulling step, the step of limiting circulation to said interconnected pair of pipes.

13. The method of claim 11 wherein said impact borer is sunk at an angle of between about 30 degrees and about 45 degrees from horizontal.

14. The method of claim 11 further comprising the step of backfilling during said sinking step.

15. The method of claim 14 wherein said backfilling step further comprises backfilling said bore hole with a backfill material repellent of water and having a greater specific gravity than water.

16. The method of claim 14 wherein said backfilling step further comprises backfilling said bore hole with bentonite.

17. The method of claim 11 wherein said blocking step further comprises the step of internally blocking said impact borer to limit circulation to a loop including said pair of pipes.

18. The method of claim 11 further comprising joining a third pipe to an impact borer, said third pipe being connected to said pair of pipes in a serial functional relation along said circulation path.

19. The method of claim 1 wherein said impact borer comprises an elongated shell with a longitudinal bore extending therethrough, said shell and said bore having opposite ends, an anvil secured to one shell end and closing one end of said bore, a ram positioned within said bore and being reciprocally slideable therein against and away from said anvil, a director secured to said shell at the other of said shell ends closing said bore at said other bore end, said ram dividing said bore into front and rear and ram chambers, said director isolating said front and rear chambers in alternation upon reciprocation of said ram, said director defining an inlet passage communicating with said ram chamber and an outlet passage communicating with said rear chamber, said at least one line connected to one of said inlet and outlet passages.

20. The method of claim 19 wherein said director has a duplicate passage, said duplicate passage being interconnected with one of said inlet and outlet passages within said director.

21. The method of claim 19 wherein said ram has a tubular bore therein, said ram bore having opposite ends and being closed at one of said ram bore ends adjacent said anvil, said director includes a manifold, an inlet tube and a guide, said guide being positioned within said ram bore, said inlet tube extending into said ram bore through an opening at said other ram end, said ram being reciprocally slideable in relation to both said guide and said shell, said inlet tube being connected to said guide, said guide being essentially stationary with respect to said shell, said inlet tube being flexible to allow said guide to align itself with said ram upon reciprocation and to accomodate misalignment of said inlet tube and guide.

22. The method of claim 1 wherein said impact borer comprises a shell, an air drive disposed within said shell, said air drive including a ram for reciprocation within said shall, and a manifold joined to said shell, said manifold defining an inlet passage delivering air to said air drive, an outlet passage receiving air from said air drive, and a duplicate passage interconnected with one of said inlet and outlet passages within said manifold, said at least one line connected to one of said inlet and outlet passages.

23. The method of claim 22 further comprising at least one plug isolating said interconnected passages from said air drive.

24. The method of claim 11 wherein said impact borer comprises an elongated shell with a longitudinal bore extending therethrough, said shell and said bore having opposite ends, an anvil secured to one shell end and closing one end of said bore, a ram positioned within said bore and being reciprocally slideable therein against and away from said anvil, a director secured to said shell at the other of said shell ends closing said bore at said other bore end, said ram dividing said bore into front and rear and ram chambers, said director isolating said front and rear chambers in alternation upon reciprocation of said ram, said director defining an inlet passage communicating with said ram chamber and an outlet passage communicating with said rear chamber, said pipes connected to said inlet and outlet passages, respectively.

25. The method of claim 24 wherein said director has a duplicate passage, said duplicate passage being interconnected with one of said inlet and outlet passages within said director.

26. The method of claim 24 wherein said ram has a tubular bore therein, said ram bore having opposite ends and being closed at one of said ram bore ends adjacent said anvil, said director includes a manifold, an inlet tube and a guide, said guide being positioned within said ram bore, said inlet tube extending into said ram bore through an opening at said other ram end, said ram being reciprocally slideable in relation to both said guide and said shell, said inlet tube being connected to said guide, said gujde being essentially stationary with respect to said shell, said inlet tube being flexible to allow said guide to align itself with said ram upon reciprocation and to accomodate misalignment of said inlet tube and guide.

27. The method of claim 11 wherein said impact borer comprises a shell, an air drive disposed within said shell, said air drive including a ram for reciprocation within said shell, and a manifold joined to said shell, said manifold defining an inlet passage delivering air to said air drive, an outlet passage receiving air from said air drive, and a duplicate passage interconnected with one of said inlet and outlet passages within said manifold, said pipes connected to said inlet and outlet passages, respectively.

28. The method of claim 27 comprising at least one plug isolating said interconnected passages from said air drive.

* * * * *